(Model.)
E. J. CLARK.
NUT LOCK.
No. 308,876. Patented Dec. 9, 1884.
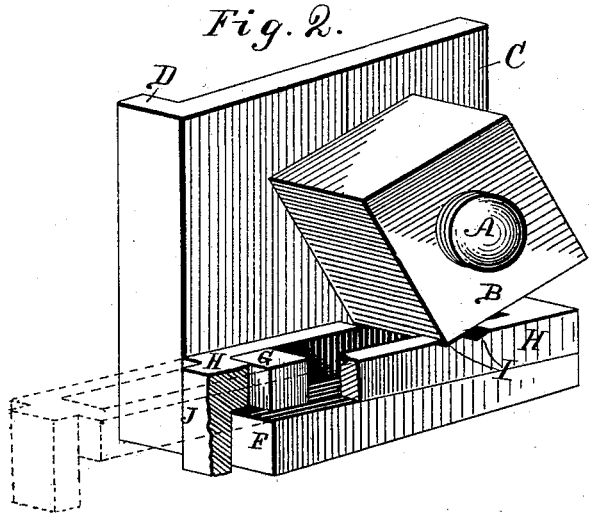
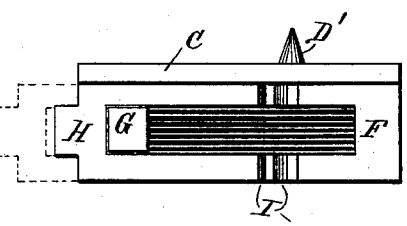
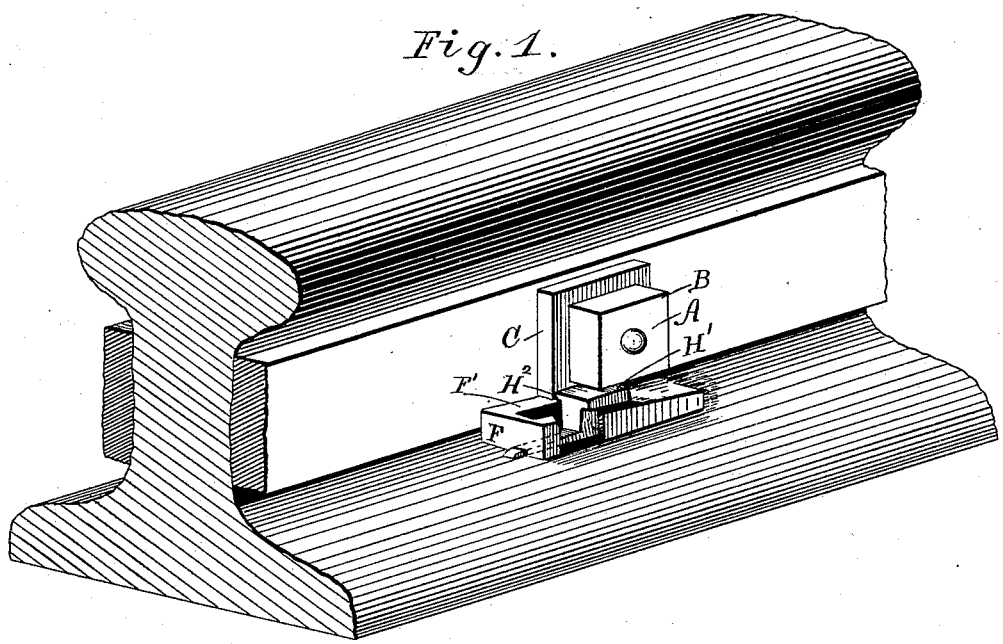
WITNESSES:
Thos. Houghton.
A. G. Lyne.
INVENTOR:
E. J. Clark
BY Munn & Co
ATTORNEYS.
N. PETERS, Photo-Lithographer, Washington, D. C.

UNITED STATES PATENT OFFICE.

ERASTUS J. CLARK, OF URBANA, ILLINOIS.

NUT-LOCK.

SPECIFICATION forming part of Letters Patent No. 308,876, dated December 9, 1884.

Application filed March 8, 1884. (Model.)

*To all whom it may concern:*

Be it known that I, ERASTUS J. CLARK, of Urbana, in the county of Champaign and State of Illinois, have invented a new and useful Improvement in Nut-Locks, of which the following is a full, clear, and exact description, reference being had to the annexed drawings, forming part of this specification.

The invention consists of the construction hereinafter described and claimed.

In the drawings, Figure 1 is a perspective view showing one form of my nut-lock. Fig. 2 is a perspective view showing another form of my nut-lock, and Fig. 3 is a plan view of the latter modified.

A indicates a bolt, and B a nut of the ordinary construction. C is a washer-plate, which is to have means to prevent it from turning on the bolt. Such means may be a flange, D, at one edge of the plate, which is to fit over a corresponding edge of a bar or beam, as the case may be; or the plate may be provided with pointed projections D', adapted to be forced into a wooden beam when used on such. The washer-plate is made somewhat larger than the nut, and is provided on its outer face with a flange, F, located sufficiently far from the nut to allow the latter to be turned on the bolt. The flange F is made wedge-shaped, forming a corresponding space between it and one of the sides of the nut when the latter is arranged with its sides parallel with the edges of the plate. The wedge-shaped flange F is provided with a lug, G, with which engages a slotted key, H, which slides on the flange F. This key is provided with one or more recesses, I, in its surface next to the nut.

Instead of forming the flange F with the lug G, and providing a slotted key, H, as above described, the flange F may be provided with a slot, F', and a key, H', adapted to slide therein.

As a matter of practical convenience the slot F' should be extended only to or near the center of the flange, in order that the key H' may have just sufficient play to be passed under the nearest corner of the nut. The top of the key H' is formed with a plane horizontal surface, and is supported by inclined flanges H² on the inclined surface of the flange F, so that the jarring of the rail will tend to throw and retain the key in locking position. When the key H' is in locking position, its lower end rests on the flange of the rail, so that no strain is thrown on the washer or flange F. This form of the nut-lock is intended primarily for railway-rails; but the other may be used successfully in any position in which it might be desirable to use it.

In operation the nut is to be screwed up, and after the locking-key is placed in position the nut is to be turned back into engagement with the key. In tightening the nut the key H will be automatically moved out of the way of the nut by the movement of the latter, and will slide back into locking position by gravity when the position of the nut allows it to pass under it.

When the two forms of nut-lock above described are used on railway-rails, for which they are specially adapted, the strain is taken practically by the flange of the rail and the keys H and H', the flanges on the washers being required to serve merely as guides for the keys.

In Fig. 1 the flange F of the washer rests on the flange of the rail, and when the key H' slides down the incline of the flange F it also comes in contact with the rail, so that when the nut is turned down against the key the strain is borne entirely by the key and rail.

In Fig. 2 the flange F is likewise adapted to rest on a flange of a railway-rail, and the key H is adapted to be supported at one end by a lug, J, which is adapted to rest on the rail-flange. In this particular of adapting the key to take a bearing on the flange of the railway-rail, instead of throwing the strain upon the washer, my invention is distinguished from all others in which the washer is provided with a flange for carrying the key. With this advantage I also combine the advantage of adapting the key to act by gravity, as in Fig. 1.

What I claim is—

1. The nut-lock consisting of a washer having a flange secured to its outer face, and a sliding key arranged in engagement with said flange, which key has a part the base of which is adapted to rest flush with the outer surface of the flange when the key is in locking position, substantially as shown and described, whereby said key may be placed between the nut and the flange of a railway-rail to take the strain off the washer and its flange.

2. The nut-lock consisting of a washer having a slotted wedge-shaped or inclined flange secured to its outer face, and a key arranged in the slot of said flange, which key has a part the base of which is adapted to rest flush with the outer surface of the flange when the key is in locking position, substantially as shown and described, whereby said key may be placed between the nut and the flange of a railway-rail to take the strain off the washer and its flange.

ERASTUS J. CLARK.

Witnesses:
THOMAS A. LEWIS,
ANDREW T. LEWIS.